United States Patent [19]

Goldberg

[11] 3,806,669

[45] Apr. 23, 1974

[54] TELEPHONE ANSWERING MONITORING SYSTEM AND METHOD

[76] Inventor: Alan Goldberg, 688 Boulevard, New Milford, N.J. 07646

[22] Filed: Oct. 24, 1972

[21] Appl. No.: 299,663

[52] U.S. Cl.......... 179/175.2 C, 179/7 R, 179/1 MN

[51] Int. Cl. ............................................ H04m 3/22

[58] Field of Search.. 179/7 R, 27 FH, 5.5, 175.2 C, 179/8 A, 175.2 B

[56] References Cited

UNITED STATES PATENTS

| | | | |
|---|---|---|---|
| 2,985,721 | 5/1961 | Gatzert | 179/27 FH |
| 3,324,245 | 6/1967 | Stenhammar | 179/5.5 |
| 3,328,538 | 6/1967 | Germanton | 179/175.2 C |

*Primary Examiner*—Kathleen H. Claffy
*Assistant Examiner*—Gerald Brigance
*Attorney, Agent, or Firm*—Ralph R. Roberts

[57] ABSTRACT

This invention pertains to a telephone answering monitoring method and system adapted to receive signals derived from incoming telephone calls and to record information as to the efficiency of answering these calls. A switch may be used for selective connection to one of several lines to feed the input signals to the system apparatus by which to monitor and record for selective recall the calls received by the line being monitored as to the number of calls and also as to those which are received and unanswered. Also recorded is information such as the number of rings which occur before the incoming call is answered and the time of "held" calls.

10 Claims, 12 Drawing Figures

FIG. 1

TELEPHONE ANSWERING MONITORING SYSTEM AND METHOD

BACKGROUND OF THE INVENTION

With respect to the classification of art as established in the United States Patent Office the present invention pertains to the general class of "Telephony" and the subclass of "systems" and the further subclass of "combined telephone and calling number recorder".

DESCRIPTION OF THE PRIOR ART

The telephone has become an essential and large part of the present method of doing business and as a part of this method it has become important that incoming calls placed to various individuals or departments within the organization be expeditiously received by these individuals and departments in order that the required business functions be accommodated and accomplished. Much time and money have been spent on highly complicated electronic equipment developed to tabulate the length and destination of incoming and outgoing calls made by individuals or made on a certain line. Equipment of this type and including more or less of this information, of course, has been highly refined by large companies and also by the telephone service system which uses recorded information to compute charges both as to the time that a call is placed, the type of call placed, the destination of the call as to the calling number and the called number. This information when used by the phone company is stored and fed back to the subscriber on his monthly telephone bill. This invention does not pertain to this type of information but instead is directed to the efficiency of the answering of the phones within an organization. For example, assume that a rather large organization has several trunk lines feeding into the main switchboard and from this switchboard the calls are directed to individual phones or lines within the organization. Where and when several telephone lines are used by a subscriber each may be fed to a master switch which is then manipulated to feed the calls from and on a selected line to the monitor. The information recorded by the monitor may be simply summarized to compute the load on the monitored line and/or to record and store the other information in the monitor. This load on the selected line of the board and the answering of the individual call is recorded to provide infomation useful in achieving the satisfactory answering of the phones or a systematic and efficient basis.

Often businessmen who are away from their offices for short or long periods of time may have their phones ansered by an answering service. This service, for example, is supposed to pick up the phone at the end of the third ring. In answering these calls the service usually writes or otherwise records the information as to the person who is calling, the time of the call and as to whether the call is to be returned. The efficiency of such an answering service may be subject to question and one of the purposes of this invention is to provide an inexpensive monitoring device which may be selectively connected to the line of an individual phone and record the desired information in monitoring apparatus, to be hereinafter more fully described. This monitor receives the incoming telephone calls by a direct wire connection to the telephone line. The connected monitor is selectively connected to a particular line and on this line records the number of rings for each incoming call up to a maximum number of rings. This information is stored in electronic equipment of small size and inexpensive construction. The incoming call may ring once, twice and perhaps up to and including nine rings, which number is stored in registers shown in the present invention. Calls which ring more than nine times may, for convenience, be registered as "nine ring" calls although registers for more rings may be provided. The depicted apparatus is shown as having a storage capacity for the ring condition for each of one through nine rings as nine hundred and ninety-nine for each information stored in the depicted apparatus. Of course, if a larger or lesser storage capacity than nine hundred ninety-nine is required or desired the register storage capacity may be expanded or reduced to accommodate the desired number of calls which are to be received and stored. The holding time for each incoming call which is initially answered and then held prior to its full answering may also be registered and stored in a separate register. The average holding time is calculated for each monitored call on the monitored line and stored for retrieval of this information at a later time.

During the initial development of the telephone, a telephone registering system was devised and patented by CLEMENT as seen in U.S. Pat. No. 1,107,155 which issued on Aug. 11th, 1914. A like registering system also to CLEMENT was issued on the same date and given U.S. Pat. No. 1,107,156. These systems registered the number of calls on the line, however, there is no facility in either of these devices patented more than sixty years ago for the storage and immediate or delayed retrieval of the desired information as to the number of rings before answering, hold time, unanswered calls, etc. by which is evaluated the efficiency of the answering of telephones in an office or the like.

SUMMARY OF THE INVENTION

This invention may be summarized at least in part with reference to its objects.

It is an object of this invention to provide, and it does provide, a telephone answering monitoring system which by means of appropriate registers the number of rings for incoming calls on a line which may be one of each of several monitored lines and records the number of rings such as from one to nine rings of the phone which occur before answering and in a storage means or register records the answering efficiency for a determined maximum of calls on the monitored line.

It is a further object of this invention to provide, and it does provide, a system whereby the incoming telephone calls are monitored and numerically is derived information which is stored as to the answering efficiency of the line being monitored.

In the apparatus, to be hereinafter more fully described, the telephone monitoring system is attached by a direct wire connection to an incoming telephone line which by switching may be one of several lines. The selected line is connected to the apparatus so that information as to the number of rings of each incoming call which occur before answering is registered for the line monitored. The number of rings range from one through a determined maximum such as nine. Where and when the maximum register is "nine", rings of more than nine calls are registered as a "nine ring" call.

A selector switch is connected to a read out device wherein the stored information regarding the number of rings is retrieved by actuation of one of the ring number condition switches. This information and other information such as number of calls, unanswered calls and other desired information is shown on a read out such as a nixie digit display device. The information from the storage register connected to the switch includes the number of rings which occurred during a determined period of time. To determine the number of calls answered after a determined number of rings, a switch is actuated to connect a particular register to a multiplexer and instantaneously is displayed, for example, the number of calls which were answered on the third ring. Switching to other storage information causes instantaneously to be displayed the number of calls answered after the selected number of ring sequences. The user of the device uses the other ring condition switches to give him a total number of answered calls answered corresponding to the number of rings on that switch. This information, which is stored in a terminal, is erased by turning a key switch to a clearing position which then permits storing of new information beginning at the erased period. The detection, registration, storage and display of the number of rings, the number of unanswered and the number of answered calls and the holding time for each monitored call is accomplished by means of the electrical components arranged in the circuitry to be hereinafter more fully described.

In addition to the above summary the following disclosure is detailed to insure adequacy and aid in understanding of the invention. This disclosure, however, is not intended to prejudice that purpose of a patent which is to cover each new inventive concept therein no matter how it may later be disguised by variations in form or additions of further improvements. For this reason there has been chosen a specific embodiment of the telephone answering monitoring system and method as adopted for use on a selected telephone line and showing a preferred circuitry for storing and recall of this information. This specific embodiment has been chosen for the purposes of illustration and description as shown in the accompanying drawings wherein:

BRIEF DESCRIPTION OF THE DRAWINGS

In the following description and in the claims various details will be identified by specific names for convenience; these names, however, are intended to be generic in their application. Corresponding reference characters refer to like components throughout the several figures of the drawings.

The drawings accompanying, and forming part of, this specification disclose certain details of construction for the purpose of providing operational means for the broader aspects of the invention, but it should be understood that suggested circuits may be modified in various respects without departure from the concept and principles of the invention and that the invention may be other circuits and other structural forms than shown.

DESCRIPTION OF THE PREFERRED EMBODIMENT

Figure 1:
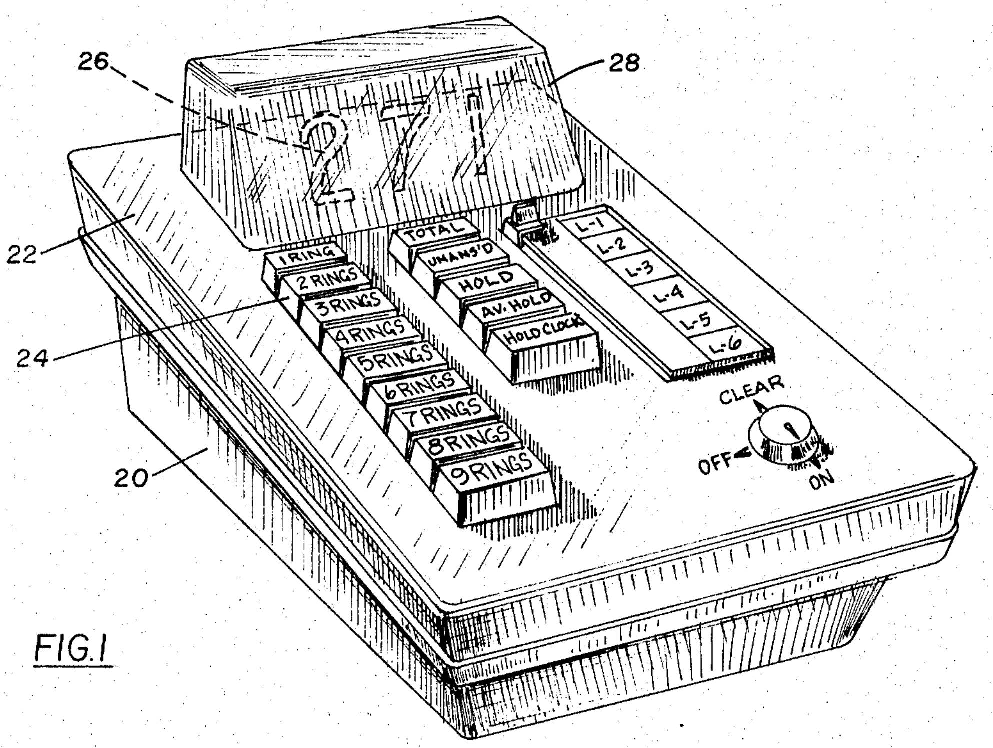
FIG. 1 represents an isometric view of the monitor housing for the apparatus of the system.

Referring now in particular to FIG. 1 there is shown an isometric view of a preferred assembled telephone answering monitoring system. As depicted, a bottom case member 20 is adapted to store and retain the several circuit modules which may be used in the system. These modules usually are printed or integrated circuit assemblies, or both. An upper cover 22 is formed so as to mate with and enclose the components carried in the bottom case member 20. Also carried in the cover are the upper bottom portions of information switches which protrude for actuation by the user of the monitor. These switches may be actuated by physically pushing or may be proximity-type switches. Upwardly directed buttons 24 preferably have indicia printed or engraved thereon so that the operator of the apparatus can visually identify those switches which when closed give the operator the desired stored information. The indicia may, instead of on the buttons, be provided on the cover 22 if desired. Light emitting diodes or nixie displays 26 are depicted as being carried in a face portion of an upwardly extending tower section 28 which may be an integral or attached portion of cover 22. A three position switch 30 is also shown as carried by and on the cover. This switch is contemplated as being key operated to prevent unauthorized use of the monitor and also to prevent unwanted or accidental shutting down and/or cancellation of stored information. This switch 30 is depicted as providing functional control of the circuit corresponding to "on", "off" and "clear" with "clear" corresponding to the removal of the stored information from the registers.

Figure 2:
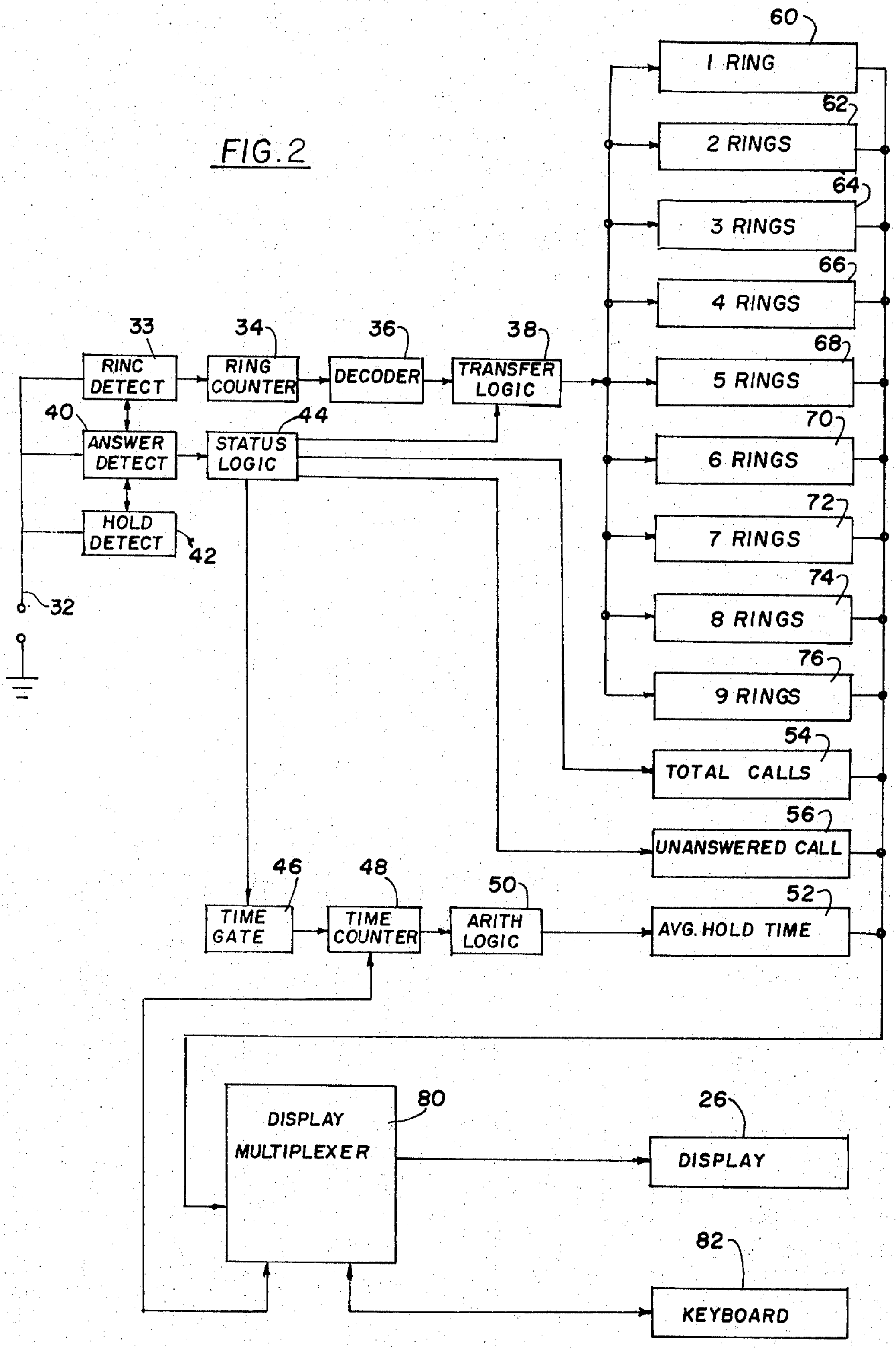
FIG. 2 is a block diagram showing a typical arrangement of the circuit of the phone answering monitoring system of this invention.

Block Diagram of FIG. 2

Referring next to FIG. 2 there is shown a block diagram of a monitor arranged for connection to a phone line identified as 32. This line is connected to a ring detect counter 33 from which the signal is fed to a ring counter 34 and thence to a detector decoder (BCD) 36. From this decoder the signal is fed to a transfer logic 38. Also from line 32 the signal is fed to an answer detector 40 which is interconnected with ring detector 33 and also interconnected to a hold detector 42. The hold detector is also connected to and fed an input signal from line 32. The output signal of the answer detector 40 is fed to a status logic 44 and from the status logic to transfer logic 38. A signal from the status logic is also fed to a time gate 46. This time gate feeds the signal to a time counter 48 and to an arithmetical progression logic 50. The result of this output goes to an average hold time register 52. Also from the status logic 44 the signal is fed to a total call register 54. By a separate conductor a signal from the status logic 44 is also fed to an unanswered call register 56.

The transfer logic feeds a signal to various ring registers. For example, a first ring signal is fed to the "one ring" register 60 and two rings to the "two ring" register 62. A three ring signal is fed to the "three ring" register 64 and a four ring signal to the "four ring" register 66. A five ring signal is fed to the "five ring" register 68 and a six ring signal to the "six ring" register 70. A seven ring signal is fed to the "seven ring" register 72 and an eight ring signal to the "eight ring" register 74. A nine ring signal is fed to the "nine ring" register 76 and it is contemplated in this embodiment that all rings more than nine be considered a "nine ring" call with that call in excess of nine stored in register 76.

The outputs of these registers are selectively fed to a display multiplexer 80 whose output is fed to light emitting display 26 and whose stored information is derived from an application signal called for by the operator closing one of the switches 24 of the group carried on keyboard 82. This block diagram will be more fully described in conjunction with the electrical circuit diagrams shown in FIGS. 6–12 hereinafter more fully described.

Figure 3:
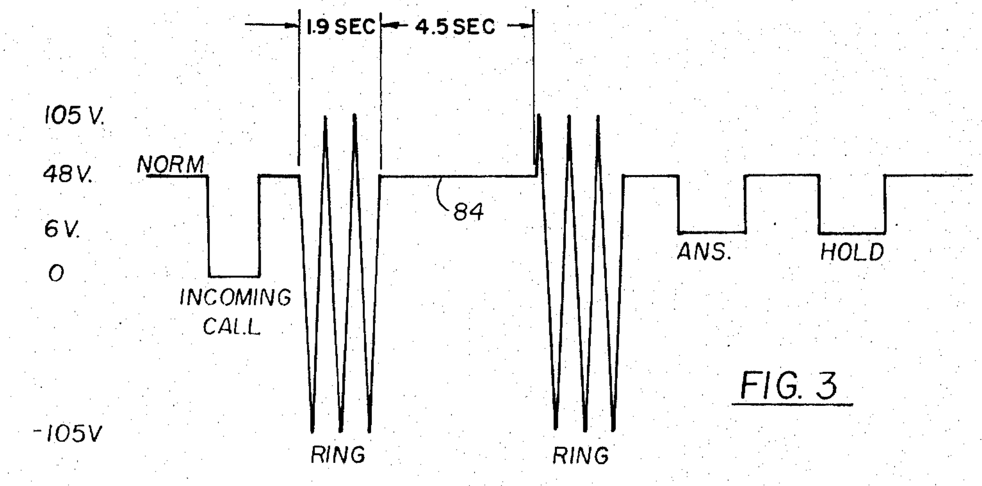
FIG. 3 represents a schematic diagram showing the line voltage levels and wave forms as used in the system.

Line Voltage Diagram of FIG. 3

In FIG. 3 is shown the line voltage level and wave forms which are known to be developed by incoming calls such as are at present found in both old and new type telephone equipment. In addition to voltages resulting from a ring signal voltages are shown for answer and hold calls. The normal voltage on line 84 is conventionally at plus forty-eight volts and when the line is connected to the center the closing of the circuit causes the voltage to momentarily drop to zero voltage for a period such as four hundred micro seconds when the connection is completed. Ringing of the bell is conventionally at two hundred cycles per second with new or modern equipment. The ring duration is conventionally one and nine-tenths seconds with a period of four and one-half seconds between rings. During this ringing period the line voltage oscillates from plus one hundred five, to minus one hundred five volts. When the receiver is lifted and while the phone is on "hold" the line voltage drops from plus forty-eight volts to about plus six volts average.

Figure 4:
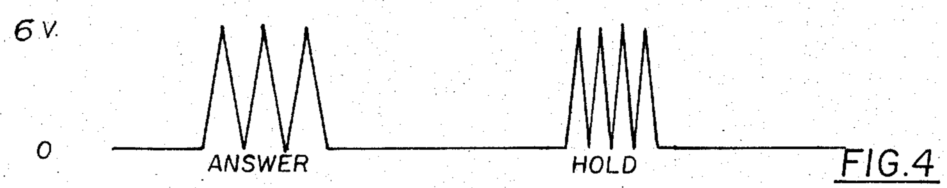
FIG. 4 represents a diagram of the indicator lamp voltage levels.

AS seen in FIG. 4, both the "answer" and "hold" signals cause the typical telephone line voltage to cycle from zero to plus six volts, however, discrimination between answer and hold is made by having the answering signal at sixty impulses and the hold at one hundred twenty impulses per second.

Figure 5:
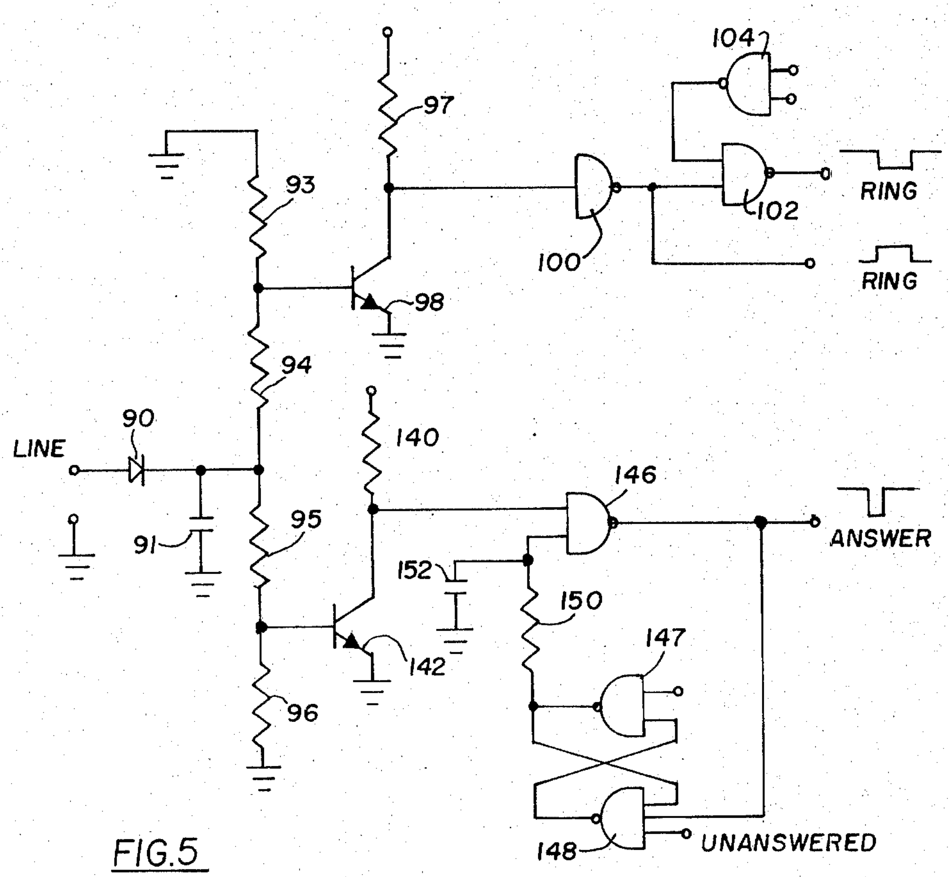
FIG. 5 represents a schematic diagram of the ring and answer detect and logic circuit.

Ring Detector as in the Diagram of FIG. 5

The ring detector stage includes a rectifier 90, capacitor 91 and a divider circuit including resistors 93, 94, 95 and 96. The top voltage divider with resistors 93 and 94 feeds a ring detecting circuit while the lower voltage divider which includes resistors 95 and 96 feeds an answered and unanswered portion of the circuit. The upper voltage divider feeds a signal to resistor 97 and transistor 98. With the line at the normal level of plus forty-eight volts this current is present at the top voltage divider. The voltage at the base of transistor 96 is below the level required to turn this transistor on. The collector leg of this transistor is at a level of plus five volts. The application of ring signal to the line causes the voltage at the top of the voltage divider to rise to plus one hundred five volts. The base of transistor 98 is now at a level sufficient to turn it on. The collector leg of transistor 96 is at zero. At one end of each ring pulse the voltage at the top divider is dropped to minus forty-eight volts causing transistor 98 to turn off; the collector leg thereof returning to plus five volts. This negative pulse in this circuit is used to produce the ring pulse with one pulse produced for each ring.

Figure 6:
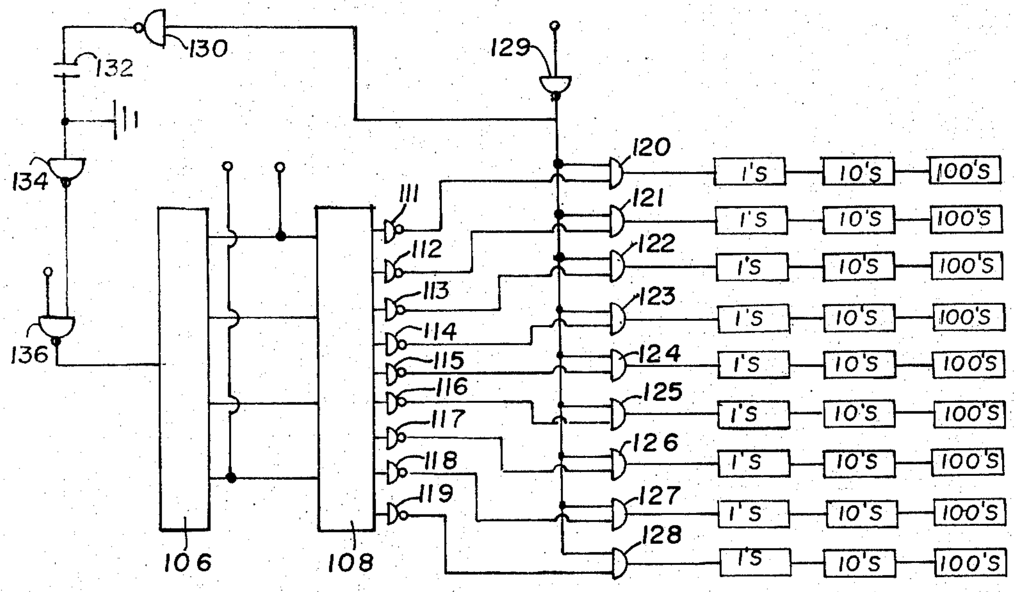
FIG. 6 represents a diagram of the circuit by which the number of rings are fed to the counter and registers.

Logic of FIGS. 5 and 6

The circuit of FIGS. 5 and 6 provide the known logic of numerical storage of sequential pulses used in computer circuits. In this circuit ring logic consists of positive NAND gates 100, 102 and 104. With the line in a normal state the output of gate 100 is low (zero volts). The output of gate 104 is high (plus five volts). The output of gate 102 is also high. A ring signal will cause the input of gate 100 to go low causing the output to go high with both inputs to gate 102 now high, the output of the gate is caused to go low. This transition causes one count to be entered in decade counter 106 (FIG. 6). Each ring will enter a count to decade counter 106 to a maximum of nine counts. This counting sequence is accomplished by gate 104. At a count of nine both inputs to gate 104 are high causing the output to be low. This low on the input of gage 102 causes the output to remain high regardless of the state of the second input thereby prohibiting additional counts to decade counter 106 in which the total number of rings are stored and present in a binary coded decimal (BCD) form at its outputs. These outputs are connected to decimal decoder 108 which converts the (BCD) input into signal line (decimal) output. A particular number of counts entered into decade counter 106 will cause the corresponding output of decade counter and decimal decoder to be low (zero) volts). Gates identified as 111, 112, 113, 114, 115, 116, 117, 118 and 119 are inverters. The outputs of these inverters are connected to two input positive NAND gates 120. One input to each of the gates 120, 121, 122, 123, 124, 125, 126, 127 and 128 is connected to gate 129 whose output is normally low causing the outputs of each of the gates 120–128 to be high. After receiving a particular number of rings one of the outputs of decimal decoder 108 will be low. The output of the associated inverter gate will be high causing one input of the associated input gate 120–128 to be high. The remaining two input gates will each have one low input causing the output to remain high regardless of the state of the second input. When the telephone receiver is lifted an answer is produced. The negative pulse at the input gage 129 causes the output to go high. At this time one of the two input gates 120–128 will have a high and both inputs and the output will go low. This negative transition will enter a count into the associated decade counter. When the answer pulse goes positive the output of inverter gate 129 will go low. This will cause the output of a gate 130 to go high. The output of gate 130 is coupled through a capacitor 132 to the input of gate 134. The input of this gate is connected through a resistor to ground. This network causes a short duration negative pulse at the output of gate 134. This negative pulse is applied to the input of gate 136 producing a positive pulse at the out-put. This pulse resets decade counter 106 to zero. This process is repeated for each incoming call. In the case of an unanswered call the decade counter is reset to zero.

Answer and Detect Logic

Still referring to FIGS. 5 and 6 the answer detector circuit stage includes rectifier 90, capacitor 91, resistors 95, 96, 104 and transistor 142. With the line at normal, plus forty-eight volts is present at the top of the voltage divider provided by resistors 95 and 96. The voltage at the base of transistor 142 is above the level required to turn the transistor on. The collector is therefore at ground zero. When the receiver is lifted to answer the ring the voltage at the top of this divider circuit falls to plus six volts. The resultant decrease in voltage at the base of transistor 142 causes this transistor to turn off. The collector leg of this transistor is then at plus five volts. This positive pulse is used to produce the answer signal. One pulse will be produced each time the telephone receiver is lifted following a ring.

Answer Logic

The answer logic consists of positive NAND gates 146, 147 and 148, resistor 150 and capacitor 152. Gates 147 and 145 are connected so as to provide a set — reset (SR) flip-flop with the output of gate 146 normally low (zero volts). This output is connected through resistor 150 to one input of gate 146.

A low voltage on an input causes the output of gate 146 to remain high (plus five volts) regardless of the state of the second input. This prohibits an answer signal from being generated when the receiver is lifted on other than incoming calls. A ring on the line causes a ring signal to be generated with a signal applied to the set input of the flip-flop 147. This causes the output of gate 147 to go high as does the associated input of gate 146. The state of the second input of this gate can now affect the output. When the receiver is lifted the second input to gate 146 will go high. Highs on both inputs of this gate will cause the output to go low. This out-put is connected to the reset input of the flip-flop. This low on an input of gate 148 causes the output to go high which in turn causes the output of gate 147 to go low. The corresponding input on gate 146 is now low so that the output will go high. A brief negative pulse has now been produced at the output of gate 146. This pulse is used as an answer signal. This circuit functions due to the propagation delay time of gates 146, 147, 148 and the time constant of resistor 150 and capacitor 152. It is, of course, realized that flip-flops are commercially available and integrated circuits such as those used in the now currently available portable calculators are contemplated for use in production models of the present apparatus.

Figure 7:
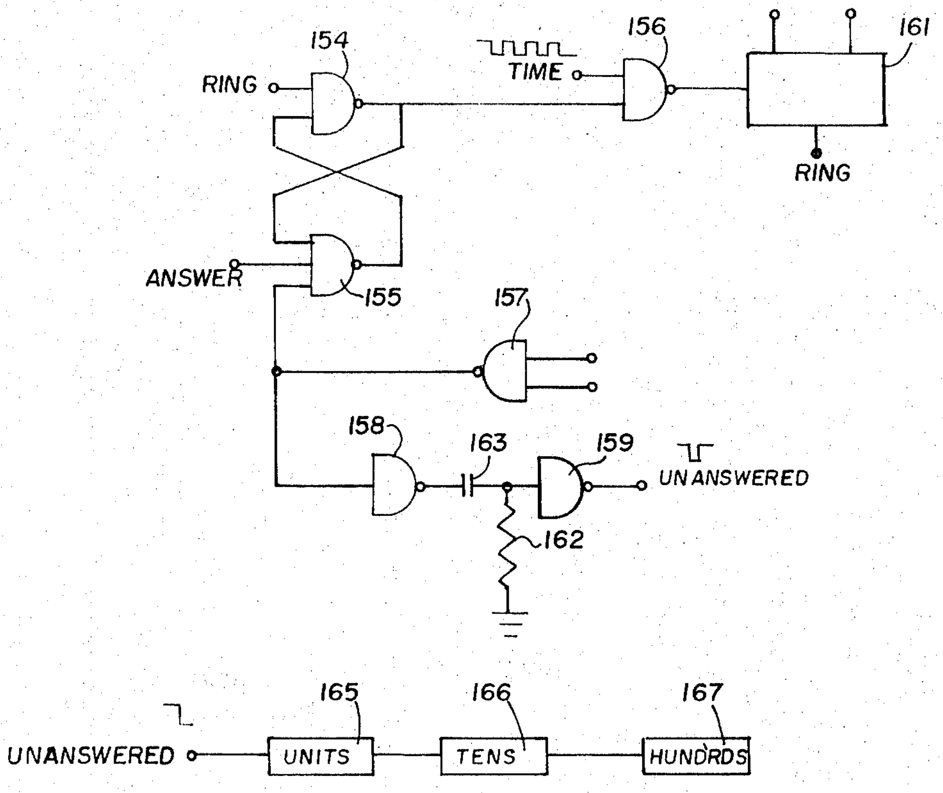
FIG. 7 represents a diagram of the unanswered call logic and registers.
Figure 8:
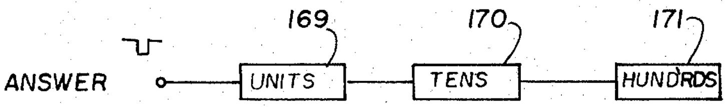
FIG. 8 represents a block diagram representing the arrangement of the total call registers.

Unanswered Call Logic and Registers of FIG. 7

Referring next to the diagram of FIG. 7 there is shown a circuit wherein an unanswered call is determined by an abnormal time period between rings. The normal interval between rings is approximately four and one-half seconds. The logic consists of positive NAND gates 154, 155, 156, 157, 158, 159 and decade counter 161, resistor 162 and capacitor 163. Gates 154 and 155 are connected to provide a set — reset (SR) flip-flop with the output of gate 155 normally high. The ring input of gate 154 is normally high. Both inputs of gate 154 being high cause the output to be low which causes one input to be made to gate 156. With one input to gate 156 low the output will remain high regardless of the state of the second input. A ring signal to the input of gate 154 of the flip-flop causes the output to go high. With one input of 156 now high the output now goes negative at one second intervals. Each negative transition will cause a count to be entered in decade counter 165. When this counter reaches a determined time interval such as five to six sec. both inputs to gate 157 will go high producing a low on the output of this gate and one input of gate 155 on the flip-flop. This will cause the flip-flop to reset resulting in a low at the output of gate 154 and one input to gate 156. The output of gate 156 will now be held high regardless of the state of the second input and no more counts will be entered into decade counter 161. This counter is held in a rest condition during the continued signal ringing. The counter starts at the end of the ring and is reset to zero at the start of each ring. An answer signal resets the flip-flop causing the time gate 156 to close and stopping counts from entering decade counter 161. The negative transition of the output of gate 157 on the count of six or other selected numbers is coupled to the input of gate 158 causing a brief negative pulse to be produced at the output of gate 159. This pulse is used as an unanswered call signal. This signal resets the ring decade counter 106. Each unanswered call signal causes one count to be entered in the unanswered call registers. As shown, these have storage units for one to nine in register 165, for "tens" registered from one to nine in register 166 and "hundreds" one to nine in register 167.

Figure 9:
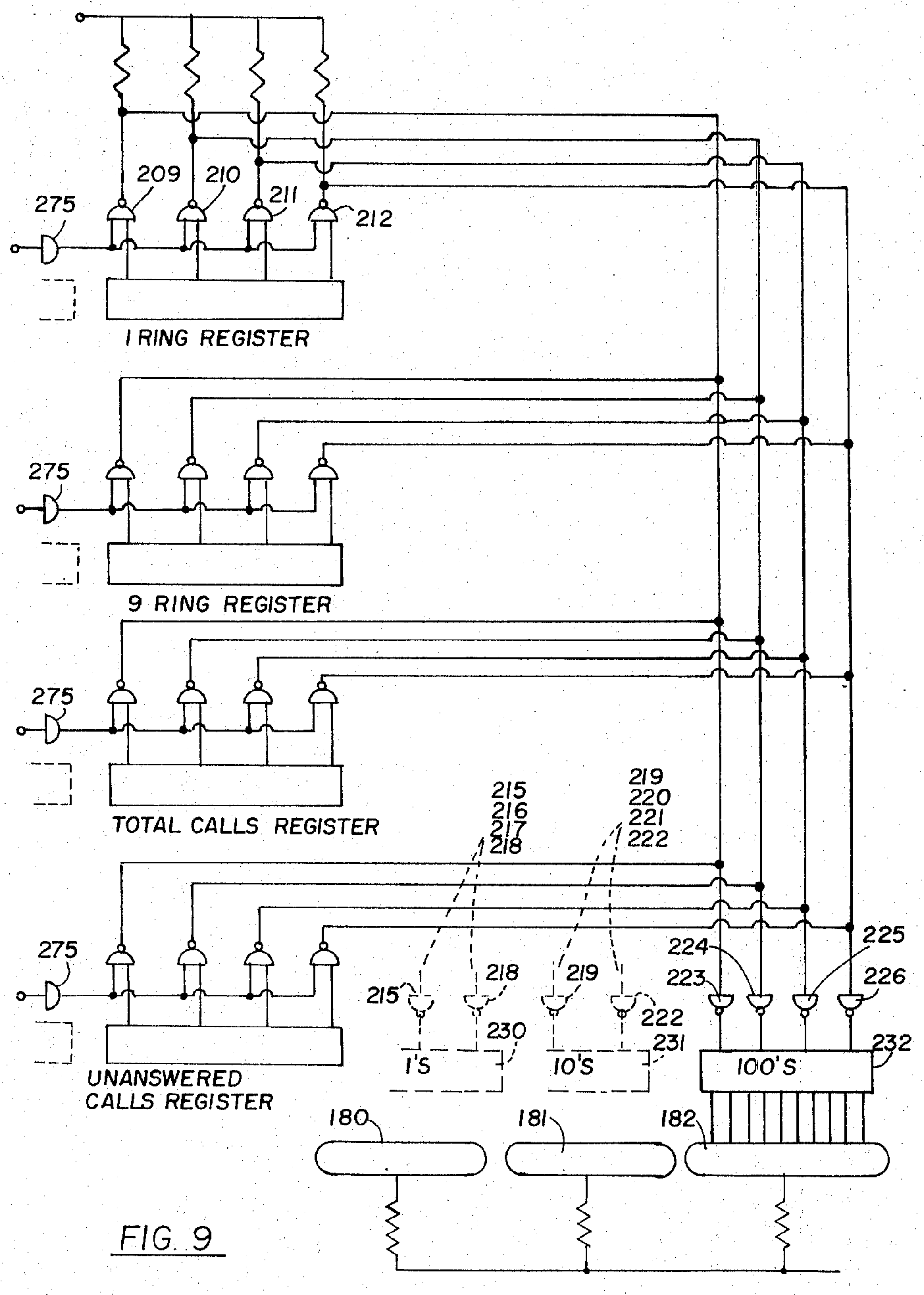
FIG. 9 represents a diagram of the display multiplex circuit shown for use with a three digit light emitting diode display.

Total Call Register of FIG. 9

Each answer signal causes one count to be entered in this register which, as depicted, has three units 169, 170 and 179 which are actuated as and like units 165, 166 and 167 above.

Figure 10:
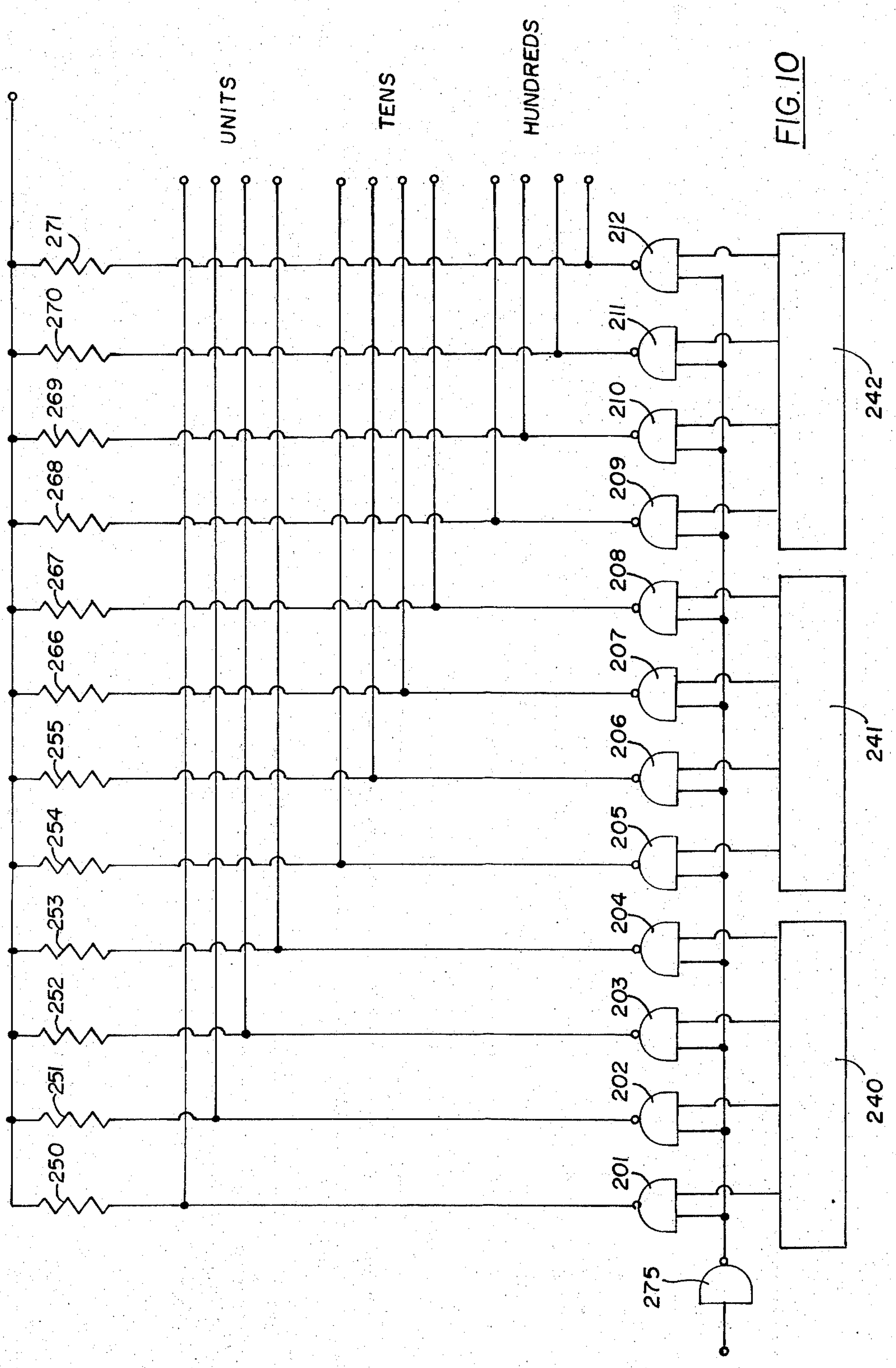
FIG. 10 represents a typical diagram of the decade counter circuit.

Display Multiplexer of FIGS. 9 and 10

Referring next to the diagrams of FIGS. 9 and 10 there is shown the display multiplexer providing one embodiment which allows the contents upon command to call from a particular register (no. or rings, total calls, etc.) the stored number to be displayed on numerical indicator units 180, 181 and 182. Each register consists of units, tens and hundreds, thereby allowing a total count of nine hundred ninety-nine to be stored in any particular register. The total count capacity of this circuitry is not limited to that shown, but can be expanded or reduced as required. The ouput of a typical multiplexing gate section is shown in FIG. 10 wherein gates 201 through 212 are connected in parallel with the corresponding output of each register in the system, FIG. 9. This results in a four line (A–B–C–D) input for each decade, after inversion by gates 215 through 226 at decimal decoder drivers 230, 231 and 232; the decoder drivers cause the light emitting diode indicator or nixie tubes 180, 181 and 182 to display the correct digit (zero through nine) entered in BCD form at the inputs of the drivers. Consider, for example, a number such as one hundred twenty-three to be stored in the total calls register (FIG. 10). The output of units counter 240 will be high (A, B, C and D) and (B, C and D). The tens counter 241 will be $\bar{A}\ \bar{B}\ \bar{C}\ \bar{D}$. The hundreds counter 242 will be A B $\bar{C}$ $\bar{D}$. Gates 201 and 202 are positive NAND gates with open collector output. Resistors 250 through 271 are the collector load resistors. This type of gate is required to allow the paralleling of outputs. The individual gate has no effect on the output of the remaining gates connected to it. Gate 275 is the enable gate with the output low in the normal state. The output is connected to one input of each gate 201 through 211. The output of each gate is therefore high causing the output of the inverter gate 275 (FIG. 10) to be low. $\overline{A\ B\ C}$ and $\bar{D}$ at the inputs of decoder drivers 230, 231 and 232 cause the numerical electronic displays 180, 181 and 182 to display the digit zero. Depression of the "total calls" button 280 on the control of unit (FIG. 11) causes switch 282 to close causing output 283 to be grounded low. This low input to gate 275 (FIG. 10) causes the output to go high. Gates 201, 206, 209 and 210 will have the remaining input high due to the count entered. The output of each of these gates will therefore be low. The output of the corresponding inverters will then be high. This combination of highs and lows (BCD code) at the inputs of decoder drivers 230, 231 and 232 will cause the light emitting diodes 180, 181 and 182 to display in order digits one, two and three.

Figure 11:
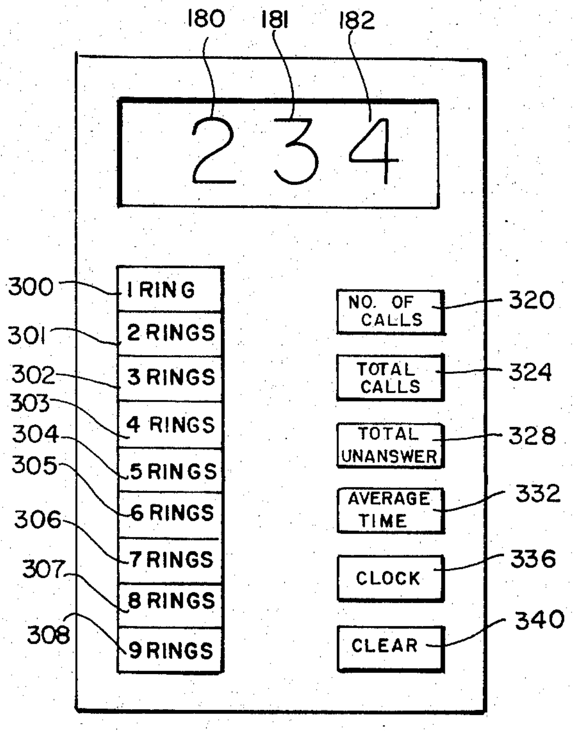
FIGS. 11 and 12 represent a schematic diagram of the key-board and associated switching system for the control unit.
Figure 12:
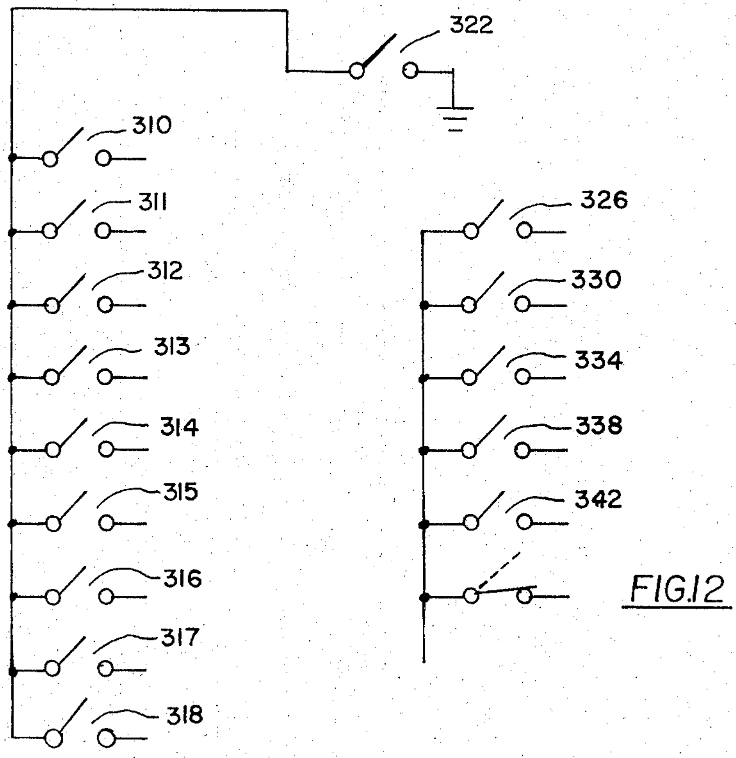

Storage Retrieval System of FIGS. 11 and 12

The typical multiplex storage section of FIG. 10 is repeated for each information retrieval. As seen in FIGS. 11 and 12, the contemplated information stored in case 20 is called forth by actuating a desired sequence of switches through manipulation of switches 24. In FIG. 11 there are depicted a sequence of ring buttons 300 through 308, each of which is able to actuate one of a series of nine switches 310 through 318. For example, button 302 when pushed closes switch 312 and draws from the corresponding register the number of calls which were answered on the third ring. This information is shown on the displays 180, 181 and 182 at the top of cover 22. These light emitting diodes display the stored switch 322.

When the total number of calls monitored by this system is to be read on display 26, the pushbutton 324 is actuated to close switch 326 and derive the stored information from the appropriate register. When the total number of unanswered calls are to be determined button 328 is actuated to close switch 330. Where the average time for answering a call is desired, button 332 is actuated closing an appropriate switch 334. If the monitor operator desires to time an incoming call the clock button 336 and appropriate switch 338 is actuated. A "clear" button 340 and switch 342 are actuated when the stored information is to be discarded or "erased" and the various registers set to zero. As seen in FIG. 1, this switch is preferably a part of a key lock 30 which is turned to provide "on" to feed power to the system; "off" which, of course, shuts off the system and "clear" which removes the stored information from the register.

There are, of course, many other types of information which may be stored to numerically record the performance on a multiplexer storage system and by appropriate switching feed this stored information to the displays 180, 181 and 182. For each line to be monitored there is required a circuit such as is shown in FIG. 2. This stored information is then switched to the display callout shown in FIG. 12. If more than a nine hundred and ninety-nine count is to be stored another display and another A B C D unit as in FIG. 10 with four associated gates are added with another decade counter and electrical display to provide a "thousands" reading. More or less, total count accumulation is merely a matter of choice.

Although the above circuit diagrams are a way of illustrating a circuit by which the monitor may be constructed of electronic components as a wired unit employing separate components, it is, of course, realized that integrated circuits, flip-flops, registers and the like may be used. It is to be further contemplated that with the development and great use of the minature light emitting diodes currently found in a very small calculators that the monitor may be constructed so that each button 24 may have such a display (LED) which, when the switch is actuated, gives the register storage number for that function. A multiple position switch, of course, may be used if desired.

It is to be further noted that electromechanical equivalents may also be used to provide a monitor with the functional analysis above indicated. Stepping switches, clocks and the like components may be actuated electrically. Whether the monitor is all electrical, semielectrical or mostly mechanical is a matter of choice as to economics, size and weight. The requirements imposed by the development engineer will guide the final product.

Terms such as "left", "right", "up", "down", "bottom", "top", "front", "back", "in", "out" and the like are applicable to the embodiment shown and described in conjunction with the drawings. These terms are merely for the purposes of description and do not necessarily apply to the position in which the monitor may be constructed or used.

While a particular embodiment of the monitor is shown to indicate an electrical mode of storing and information from the monitoring system has been shown and described it is to be understood the invention is not limited thereto since modifications may be made within the scope of the accompanying claims and protection is sought to the broadest extent the prior art allows.

What is claimed is:

1. A telephone answering monitoring system adapted to receive incoming signals carried by a telephone line and to store for selective recall information as to whether the call is answered, unanswered and if answered, after how many rings, said system including: (a) means to receive on a selected telephone line the incoming call signal; (b) a ring detector which is actuated by an incoming call signal as carried by the line; (c) a ring counter which counts and stores the number of rings which occur with the incoming call in the monitored line up to and including a selected maximum number of rings such as nine, the counter being deactivated with an answering of the call as well as by the "hanging up" by the calling party; (d) a detector decoder which translates the number of rings before the counter is deactivated into a binary pulse signal; (e) a transfer logic which receives the binary pulse signal from the detector decoder and feeds this information to one of a multiplicity of registers, the information being a triggering pulse coded to feed a particular register whose gate is conditioned to pass only this pulse to the register; (f) an answer detector which is fed a signal from the ring detector when the ring signal is stopped by the lifting of a receiver on the line; (g) a status logic which is actuated by a signal from the answer signal and, in response thereto, feeds a signal to a register for recording the total number of calls and when the call is unanswered records those unanswered calls in another register; (h) a display multiplexer including a visual readout adapted to receive selectively stored information from the several storage registers and to numerically display on the read-out such selective information, and (i) a keyboard control including switching means actuated by keyboard selector means, such as buttons to connect that information stored in a particular register related to that particular switch means to the display multiplexer so that a numerical readout of the stored information is provided the operator.

2. A telephone answering monitor as in claim 1 in which there is also provided a hold detector interconnected with the answer detector so as to be actuated by a "hold" signal derived by a voltage change on the line caused by an actual "hold" actuation of and on the answering phone on th line, said hold signal being fed to the status logic which feeds a resulting signal to a time counter and to an arithmetic logic and register, the logic and register when the stored information is recalled giving an average time of the "hold" for all the "held" calls during the monitoring period.

3. A telephone answering monitor as in claim 2 in which the time counter is connected to the keyboard so that in response to a switch actuation the time running of the clock may be visually seen on the display so as to place an elapsing time monitoring on a particular call as it is being "held".

4. A telephone answering monitor as in claim 1 in which the monitor is adapted to record in the register the number of rings which occur before the call is answered, this number including all numbers from one to nine and with all calls of more than nine being grouped with the "nine-ring" calls.

5. A telephone answering monitor as in claim 4 in which each of the ring number detector storage means is a register adapted to store for recall a numerical storage of up to and including nine hundred ninety-nine.

6. A telephone answering monitor as in claim 1 in which the control of the monitor is, in part, provided by a switch which may be actuated only by a key, said switch providing the function for turning the monitor "on", "off" and for "clear", which means removing all the stored information in the register.

7. A telephone answering monitor as in claim 1 in which the numerical readout is a light emitting means which is electronically actuated, the readout providing at least a plurality of digits.

8. A telephone answering monitor as in claim 1 in which the monitor is provided with a multiple pole selector switch connected to a plurality of telephone lines and with said switch selectively movable to connect one of said lines at a time to the monitor for monitoring only the selected connected line.

9. A method of monitoring a telephone line as to incoming calls by evaluating the voltage variations of incoming signals carried by the telephone line and to record for selective recall whether the call is answered, unanswered and if answered after how many rings, said method including the steps of: (a) connecting a monitor so as to receive on a selected telephone line the incoming call signal; (b) detecting a ring signal of an incoming call carried by the line; (c) counting by a ring counter the number of rings which occur with the incoming call in the monitored line up to and including a selected number of rings such as nine and storing said count in a counter means until the counter is deactivated with an answering of the call as well as by the "hanging up" by the calling party; (d) translating and transferring the stored count of the number of rings into a binary pulse signal and feeding this binary pulse signal to a transfer logic which receives the signal from the decoder; (e) feeding the signal from this logic to one of a multiplicity of registers, the logic information being a triggering pulse coded to feed a particular register whose gate is conditioned to pass only this pulse to the register; (f) detecting the answering of the call by means of a coded pulse and a signal when the ring signal is stopped by the lifting of a receiver on the line and feeding this pulse to a status logic which feeds this signal to a register for recording the total number of calls and when the call is unanswered detecting the incoming signal and recording as an unanswered call this ring signal in another register; (g) connecting a display multiplexer to the several registers to receive selectively stored information from this storage register and to numerically display such selective information and (i) by manipulating switching means actuated by a keyboard operator connecting that information stored in a particular register related by a switch means to the display multiplexer so that a numerical readout of this stored information is actuated for the reading of this information by the operator on a lighted digit means.

10. A method of monitoring a telephone line as in claim 9 in which there is also provided a detecting of the holding of the line, which detecting is actuated by a "hold" signal derived by an actual hold of the answering phone on the line, said "hold" signal being fed to a status logic, said logic feeding a signal to a time counter and to an arithmetic logic and register and recalling this stored information as an average time of the "hold" for all the "held" calls during the monitoring period.

* * * * *